(12) United States Patent
Kim et al.

(10) Patent No.: US 8,917,479 B2
(45) Date of Patent: Dec. 23, 2014

(54) HARMONIC SHAPING OF A MOTOR (71) Applicant: Seagate Technology LLC, Cupertino, CA (US)

(72) Inventors: Ungtae Kim, San Jose, CA (US); Paco G. Flores, Felton, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/892,164

(22) Filed: May 10, 2013

(65) Prior Publication Data

US 2014/0146415 A1 May 29, 2014

Related U.S. Application Data (60) Provisional application No. 61/729,537, filed on Nov. 23, 2012.

(51) Int. Cl.
*G11B 19/20* (2006.01)

(52) U.S. Cl.
USPC ........................................ 360/99.08

(58) Field of Classification Search
USPC ........................................ 360/99.08
See application file for complete search history.

(56) References Cited

U.S. PATENT DOCUMENTS

| | | | |
|---|---|---|---|
| 5,463,511 A * | 10/1995 | Nakano et al. | 360/99.08 |
| 5,502,605 A * | 3/1996 | Myokan | 360/99.08 |
| 5,625,511 A | 4/1997 | Brooks et al. | |
| 6,124,776 A | 9/2000 | Aiello et al. | |
| 6,242,826 B1 * | 6/2001 | Saito et al. | 310/51 |
| 6,501,616 B1 * | 12/2002 | Neal | 360/99.08 |
| 6,570,360 B1 | 5/2003 | Freeman | |
| 6,603,225 B2 * | 8/2003 | Heine et al. | 310/67 R |
| 7,394,908 B2 | 7/2008 | Ikeda et al. | |
| 7,420,309 B2 * | 9/2008 | Wakitani et al. | 310/216.048 |
| 7,569,967 B2 * | 8/2009 | Fujita et al. | 310/208 |
| 7,696,655 B2 * | 4/2010 | Shishido et al. | 310/51 |
| 8,400,729 B1 * | 3/2013 | Watanabe | 360/99.08 |
| 8,416,523 B2 * | 4/2013 | Tashiro | 360/99.08 |
| 8,451,557 B2 * | 5/2013 | Nagai et al. | 360/99.08 |
| 8,508,882 B1 * | 8/2013 | Tamaoka et al. | 360/99.08 |
| 8,599,517 B1 * | 12/2013 | Abe | 360/99.08 |

* cited by examiner

*Primary Examiner* — Mark Blouin (57) ABSTRACT

A device includes a magnet and a magnetizer. The magnetizer is operable to rotate with respect to the magnet. The rotation generates an acoustic pure tone at a particular frequency. A combination of the magnet and the magnetizer has a magnetic profile. The combination is altered to superimpose a particular harmonic shape on the magnetic profile to reduce the acoustic pure tone at the particular frequency.

20 Claims, 7 Drawing Sheets

| Magnet Harmonics / Stator Harmonics | 1 | 2 | 3 | 4 | 5 | 6 |
|---|---|---|---|---|---|---|
| 1 | Constant | 3, 1 | 4, 2 | 5, 3 | 6, 4 | 7, 5 |
| 2 | 3, 1 | 4, Constant | 5, 1 | 6, 2 | 7, 3 | 8, 4 |
| 3 | 4, 2 | 5, 1 | 6, Constant | 7, 1 | 8, 2 | 9, 3 |
| 4 | 5, 3 | 6, 2 | 7, 1 | 8, Constant | 9, 1 | 10, 2 |
| 5 | 6, 4 | 7, 3 | 8, 2 | 9, 1 | 10, Constant | 11, 1 |
| 6 | 7, 5 | 8, 4 | 9, 3 | 10, 2 | 11, 1 | 12, Constant |

IDENTIFYING A FREQUENCY ASSOCIATED WITH A PARTICULAR
ACOUSTIC PURE TONE
610

ALTERING CHARACTERISTICS OF THE MOTOR MAGNET AND THE
MAGNETIZER CORE
620

HARMONIC SHAPING OF A MOTOR

RELATED APPLICATION

This application claims the benefit of and priority to U.S. provisional patent application No. 61/729,537, titled "Harmonic Shaping of a Motor", filed Nov. 23, 2012.

BACKGROUND

In magnetic recording media, as used in hard disk storage devices, information is written to and read from magnetic elements that represent digital bits. In order to increase the amount of information that can be stored within a given area, the size and distance between these magnetic elements may be reduced to pack them more densely. At the same time, the number of disks used in a given area may be increased. Acoustic performance of a hard drive is a factor in hard drive performance. Acoustic performance may be affected, for example, by overall sound power and acoustic pure tones.

Acoustic pure tones may be modified in order to adjust acoustic performance, For example, the overall force generated by the motor may be reduced, in turn reducing the energy that drives pure tones. Reducing the overall force reduces the number of disks that can be rotated by reducing the amount of torque that rotates the disks.

SUMMARY

A device includes a magnet and a magnetizer. The magnetizer is operable to rotate with respect to the magnet. The rotation generates an acoustic pure tone at a particular frequency. A combination of the magnet and the magnetizer has a magnetic profile. The combination is altered to superimpose a particular harmonic shape on the magnetic profile to reduce the acoustic pure tone at the particular frequency.

BRIEF DESCRIPTION OF DRAWINGS

The present invention is illustrated by way of example, and not by way of limitation, in the figures of the accompanying drawings and in which like reference numerals refer to similar elements.

DETAILED DESCRIPTION

Reference will now be made in detail to embodiments, examples of which are illustrated in the accompanying drawings. While the embodiments will be described in conjunction with the drawings, it should be understood that they are not intended to limit the embodiments. On the contrary, the embodiments are intended to cover alternatives, modifications and equivalents. Furthermore, in the following detailed description, numerous specific details are set forth in order to provide a thorough understanding. However, it will be recognized by one of ordinary skill in the art that the embodiments may be practiced without these specific details. In other instances, well-known methods, procedures, components, and circuits have not been described in detail as not to unnecessarily obscure aspects of the embodiments.

In general, one of the factors to consider in designing a hard drive is acoustic performance of the hard drive. Acoustic performance may include overall sound power and acoustic pure tones. Acoustic pure tones may be described as frequency bands that stand above the overall tone levels in a system.

Spindle motors may provide energy to drive acoustic pure tones that appear as natural resonate frequencies of the drive mechanical structure. It is appreciated that the acoustic pure tones may result and be based on the number of magnet poles and stator harmonic number of a spindle motor. Reducing the overall force of the motor may reduce acoustic pure tones. However, reducing the overall force of the motor also reduces the number of disks that can be rotated, because it reduces the torque in the system.

The source of mechanical energy of the spindle motor is generally electromagnetically driven and is further based on the harmonics of the motor magnetic components. Acoustic pure tones may be generated when an electromagnetic frequency approaches a resonate frequency of the drive structure. It is appreciated that acoustic pure tones may be generated by the spindle motor and may be based on the number of magnetic poles and the stator harmonic number of the spindle motor. Accordingly, acoustic pure tones may be impacted by shaping the harmonics of the motor. For example, acoustic pure tones of the system may be reduced by shaping the harmonics of the magnet, in one instance, while maintaining the overall force of the motor substantially the same as before. Therefore, shaping the harmonics of the magnet has little impact on the amount of torque and therefore on the number of disks that can be used. In some embodiments, the harmonics may be shaped by harmonically designing the back iron of the motor.

It is appreciated that designing a motor magnet having a sinusoidal magnetization profile waveform may reduce unnecessary force harmonics. However, certain resonate frequencies may be driven by a sinusoidal waveform that contributes to acoustic pure tones. As such, additional harmonics may be introduced by designing the motor, e.g., magnetization profile of a magnet and/or magnetizer core, to attenuate one or more acoustic pure tones at frequencies of concern.

Figure 1A:
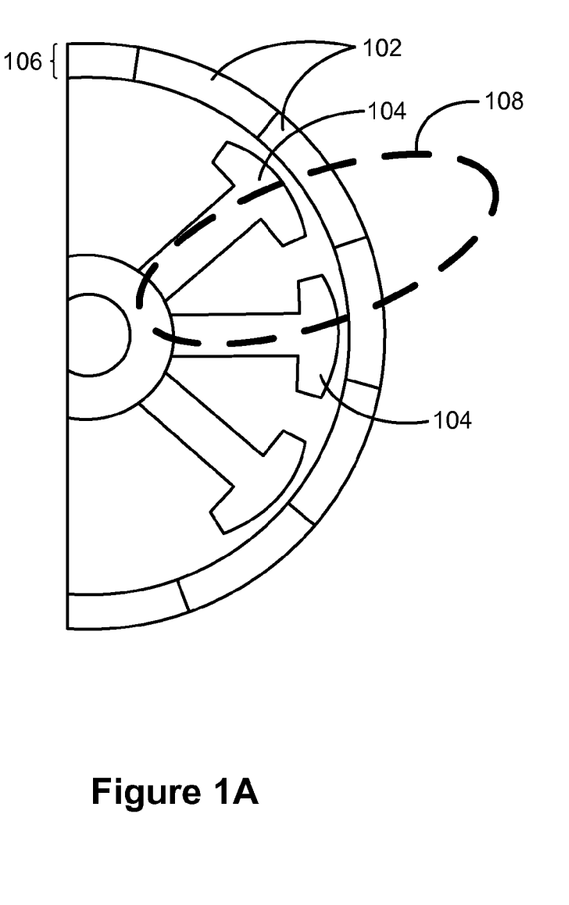
FIGS. 1A and 1B illustrates magnetic pole transitions, according to one aspect of the present embodiments.

Referring now to FIG. 1A, a magnetic circuit in accordance with one embodiment is shown. In FIG. 1A, the magnet poles 102 transition between two stator teeth 104 and the magnetic circuit is primarily through the stator stem (coil) and yoke. As the magnet 106 rotates, the transition between two poles aligns between the two stator teeth 104. Accordingly, the flux travels through the stems and coil, as illustrated by the dashed lines 108. The driver may control the flux through this path.

Figure 1B:
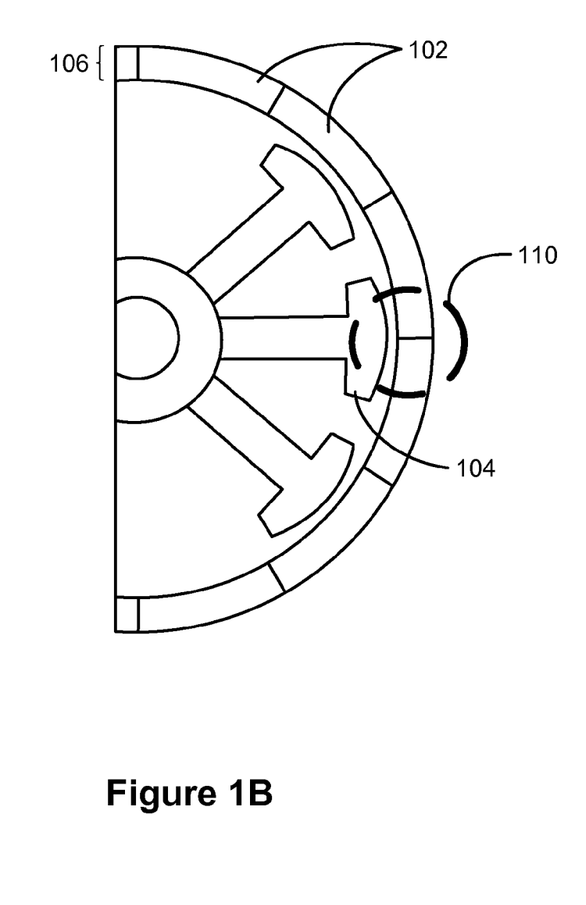

Referring now to FIG. 1B, a magnetic circuit in accordance with one embodiment is shown. When the magnet poles 102 transition in the center of a tooth 104, the magnetic circuit is primarily through the tooth 104, as illustrated by the dashed lines 110. However, this transition does not travel through the coil and therefore cannot be controlled by the driver in comparison to FIG. 1A. In this embodiment, a particular harmonic may be superimposed to alter the magnetic profile, thereby controlling the flux and reducing the acoustic pure tones at certain frequencies.

Figure 2:
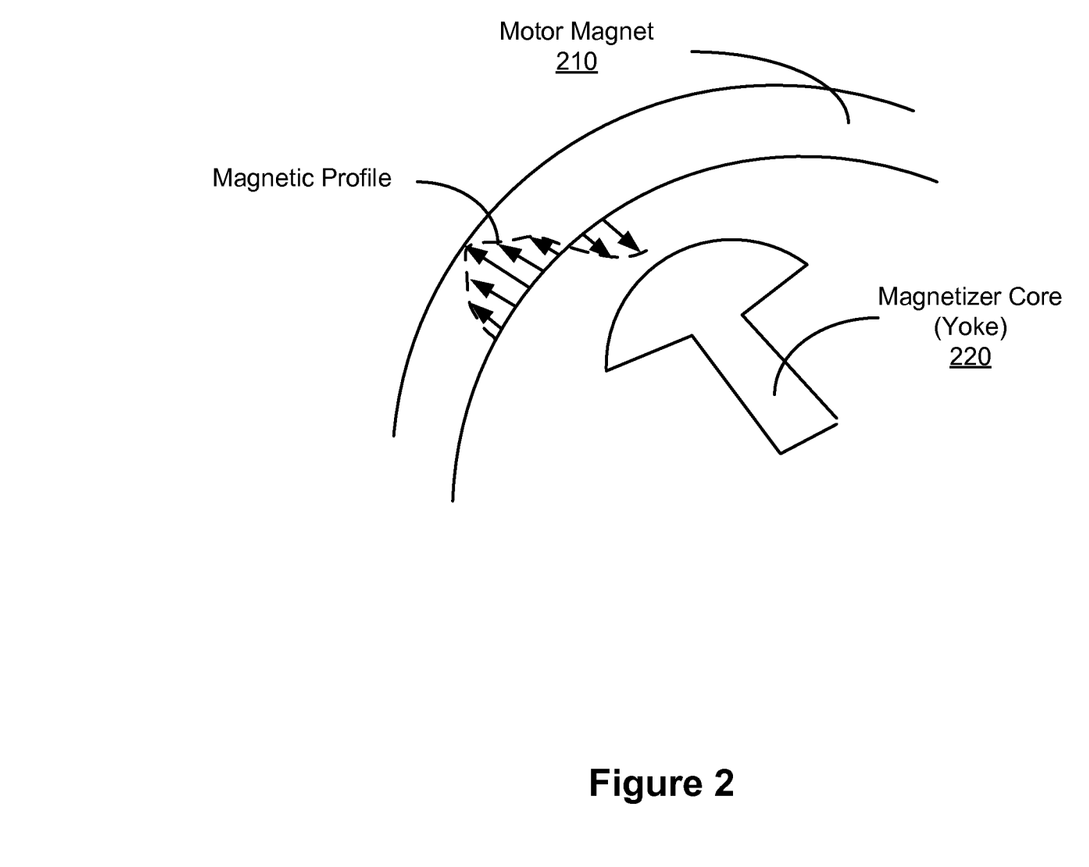
FIG. 2 illustrates a magnetization profile of a motor, according to one aspect of the present embodiments.

Referring now to FIG. 2, an illustration of a magnetization profile of a motor according to one embodiment is shown. A motor magnet 210 is shown in conjunction with its magnetizer core (yoke) 220. It is appreciated that the motor magnet 210 may have been designed separately or in combination with the core 220 to have a certain magnetic profile, e.g., sinusoidal, as shown. In some embodiments, a magnetization profile may be measured directly by measuring a change in the magnetized potential of the magnet. As a result the magnetic field and hence its profile may be identified.

According to one embodiment, one or more acoustic pure tones are measured or predicted prior to designing the magnetization profile. Hereinafter, references to magnetization profile are a reference to the magnetic characteristic of the motor magnet 210, the magnetizer core (yoke) 220, or a combination thereof.

Identifying one or more acoustic pure tones may identify the frequencies at which further modifications may be made in order to adjust acoustic performance. For example, the acoustic performance may be adjusted by changing the design of the motor magnet 210 and/or the magnetizer core 220 such that the magnetic profile is changed, e.g., by superimposing a harmonic on the magnetic profile in order to shape and create a new magnetic profile.

Harmonics associated with one of more frequencies of acoustic pure tones that contribute to performance degradation may be identified. Accordingly, performance may be improved and the presence of acoustic pure tones at the identified frequencies may be reduced if the identified harmonics are adjusted, e.g., by superimposing other harmonics on them.

Figure 3:
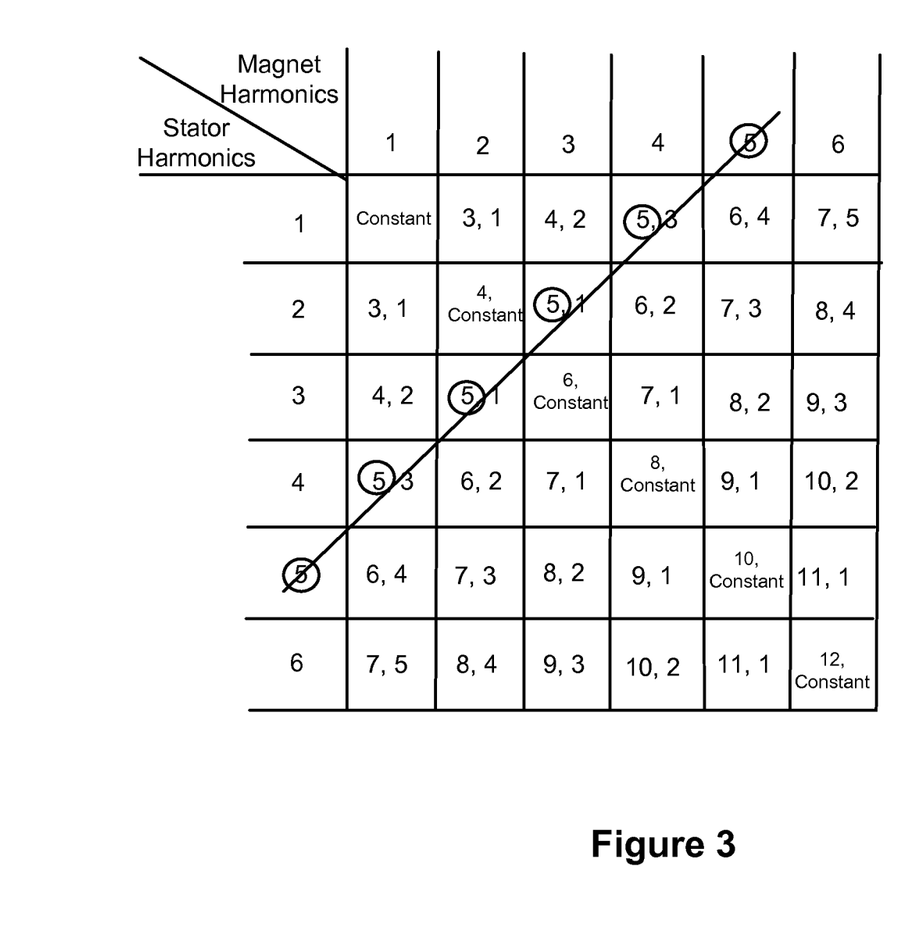
FIG. 3 illustrates identifying harmonics of interest using magnet harmonics versus stator harmonics, according to one aspect of the present embodiments.

Referring now to FIG. 3, identifying harmonics of interest using magnet harmonics versus stator harmonics in accordance with one embodiment of the present invention is shown. In this example, the frequency of acoustic pure tone that contributes the most to performance degradation is identified. It is appreciated that identifying the frequency of acoustic pure tone that contributes the most to performance degradation is exemplary and not intended to limit the scope of the embodiments described herein. For example, multiple frequencies of acoustic pure tones, each of which contributes to performance degradation may be identified and their respective harmonics may also be identified. Accordingly, each of the identified harmonics may be adjusted in order to improve performance.

In this exemplary embodiment, the frequency of acoustic pure tone that contributes the most to performance degradation is identified. The harmonics of interest may be identified by using the frequency of the acoustic pure tone that contributes the most to the performance degradation. In this example, it is determined that the frequency of the acoustic pure tone contributing the most to performance degradation is the fifth harmonic.

As depicted in FIG. 3, the fourth harmonic of the magnet and the first harmonic of the stator result in a fifth harmonic. Similarly, a third harmonic of the magnet and the second harmonic of the stator result in a fifth harmonic. A second harmonic of the magnet and the third harmonic of the stator lead to a fifth harmonic. And finally, a first harmonic of the magnet and a fourth harmonic of the stator result in a fifth harmonic.

In other words, a particular harmonic of the motor magnet, and a stator, and/or magnetizer core resulting in a fifth harmonic associated with the frequency of an acoustic pure tone that contributes to performance degradation can be identified. Once a particular harmonic is identified, the motor magnet and/or magnetizer core (yoke) may be designed to have a particular magnetic profile shape at the identified frequency by superimposing a particular harmonic to its already magnetic profile. Therefore, at least one or more acoustic pure tones at the identified frequencies may be reduced to improve performance.

Figure 4A:
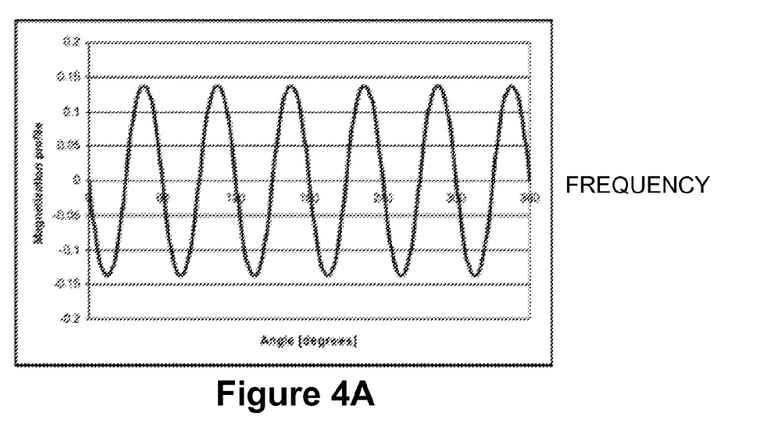
FIGS. 4A and 4B illustrate an exemplary magnetization profile before and after shaping the harmonics, according to one aspect of the present embodiments.
Figure 4B:
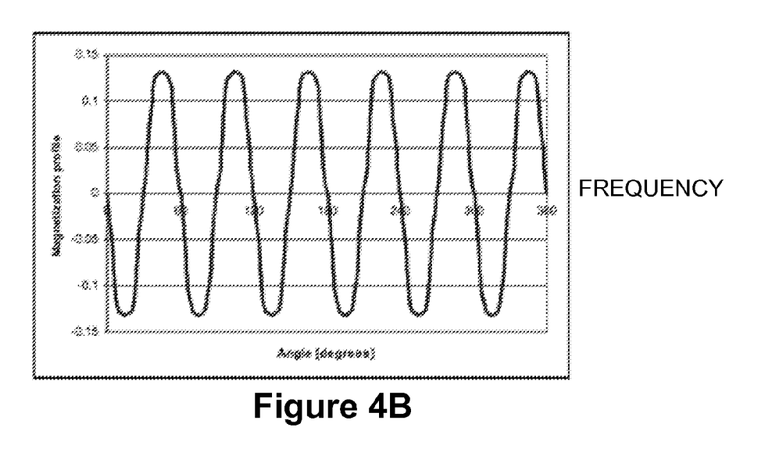

Referring now to FIG. 4A, an exemplary sinusoidal waveform for a magnetic profile of a motor is shown. FIG. 4B depicts a magnetization profile of the motor in accordance with one embodiment after the harmonic has been identified and the particular harmonic shape is introduced, creating the desired magnetic profile, thereby reducing the acoustic pure tones at certain frequencies.

It is appreciated that designing the motor magnet, a stator, and/or the magnetizer core to have a given magnetic profile by introducing a harmonic to the original magnetic profile may reduce the impact of acoustic pure tones at certain frequencies, e.g., at 1080 Hz. It is further appreciated that superimposing a particular harmonic to an existing magnetic profile is not limited to the motor magnet, a stator, and the magnetizer core but can be applied to any magnetic component having a magnetic profile to reduce acoustic pure tones at certain frequencies, thereby improving performance. As such, embodiments described with respect to superimposing particular harmonics to change the magnetic profile of a motor magnet and/or the magnetizer core are exemplary and not intended to limit the scope of the embodiments described herein.

Figure 5:
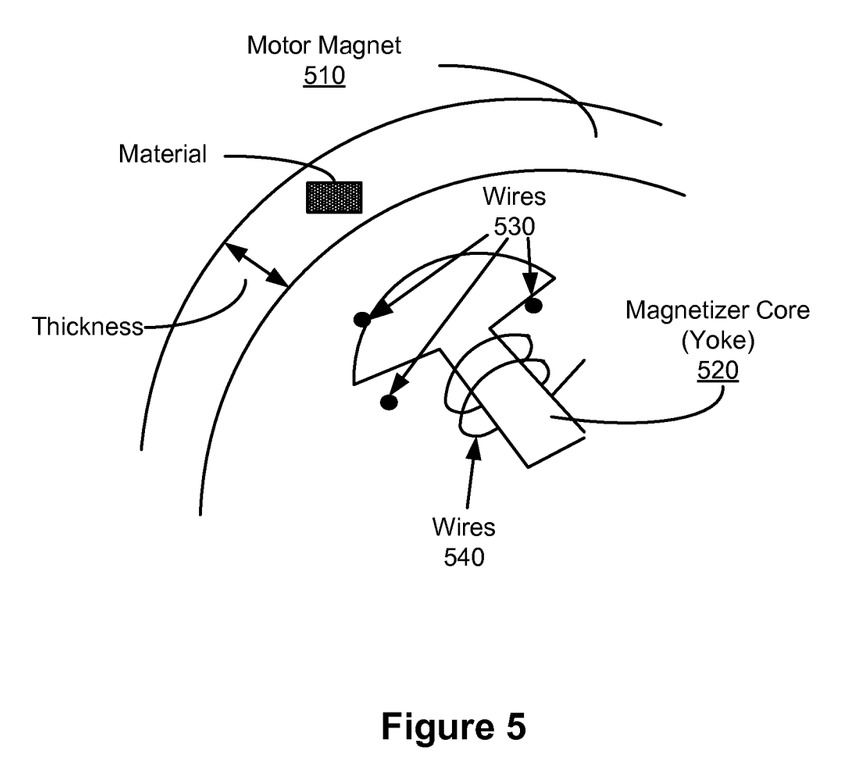
FIG. 5 illustrates designing a magnetization profile of a motor, according to one aspect of the present embodiments.

Superimposing a particular harmonic to an existing magnetic profile of a magnetic component at an identified frequency to reduce acoustic pure tones at the identified frequency in order to improve performance is discussed with respect to FIG. 5. In FIG. 5, an exemplary embodiment to design the magnetization profile of the motor in accordance with one embodiment is shown. The magnet, as shown, may include a motor magnetic portion 510 and a magnetizer core (yoke) portion 520. It is appreciated that embodiments described with respect to designing the magnetic profile of a motor magnet, a stator, and/or magnetizer core are exemplary and not intended to limit the scope of the embodiments. For example, the embodiments described herein may be applied to any magnetic component in order to change its magnetic profile.

According to one embodiment, the magnetic profile of the motor magnet portion 510 may be adjusted by varying its thickness. It is appreciated that the thickness may be varied uniformly or in a non-uniform fashion. Changing the thickness of the magnet portion 510 may in effect superimpose a particular harmonic at a certain frequency, causing the magnetic profile of the magnet portion 510 to be changed, as desired, thereby reducing the amount of acoustic pure tone at the identified frequency. It is further appreciated that the magnetic profile of the motor magnet portion 510 may be changed by changing its shape, e.g., it may be rectangular, circular, trapezoidal, cylindrical, etc in shape, and/or it may include notches, teeth, protrusions, intrusions, grooves, etc.

According to one embodiment, changing the material that forms the motor magnetic portion 510 may change the magnetic profile of the motor magnetic portion 510. In other words, changing one or more properties associated with the motor magnetic portion 510 can change the magnetic profile of the motor magnetic portion 510. In one exemplary embodiment, changing the flux density of the motor magnetic portion 510 may change the property characteristic of the motor magnetic portion 510. It is appreciated that the flux density may be uniform or non-uniform, as desired. As such, changing one or more characteristics of the motor magnetic portion 510 may superimpose a particular harmonic at the identified frequency to reduce acoustic pure tones at the identified frequency, thereby improving performance.

In one embodiment, the magnetic profile may be changed by positioning wires at one or more locations near the magnetizer core (yoke) 520. For example, wires 540 may wind around the magnetizer core 520, as shown. In one exemplary embodiment, the wire winding conducts current and therefore changes the voltage/current and as a result the magnetic field. As such, the harmonic shape of the magnetic profile may be altered. It is appreciated that the wires may be positioned elsewhere, e.g., in a non-winding position as shown by wires 530. It is appreciated that the position of the wires 530 may by symmetrical or non-symmetrical. It is appreciated that the diameter of the wires 530 and/or 540 may be different or the same. As such, wires 530 may conduct varying amount of current, thereby altering the magnetic profile.

It is further appreciated that the magnetizer core 520 characteristics may be further changed by changing the flux density of the magnetizer core 520 and/or by changing its shape, size, and/or thickness. The magnetizer core (yoke) 520 may be rectangular, circular, trapezoidal, cylindrical, may include notches, teeth, protrusions, intrusions, grooves, etc. It is appreciated that in order to change the magnetic profile of the motor, the magnet design may combine one or more of the changes above to the motor magnet 510 and/or the magnetizer core (yoke) 520.

It is appreciated that embodiments described herein with respect to reducing acoustic pure tones at a particular frequency by superimposing a particular harmonic to alter the magnetic profile of a magnetic component are exemplary and not intended to limit the scope of the embodiments. For example, a similar approach may be employed to discover multiple pure tones at multiple frequencies and to superimpose multiple harmonics at the identified multiple frequencies.

It is appreciated that while various embodiments describe changing the magnetic profile by varying characteristics and design of the motor magnet, a stator magnet, magnet and/or magnetizer core (yoke), other design changes may be employed. For example, the back iron may also be altered, either alone or in addition to changes made to the motor magnet, the stator magnet, and/or the magnetizer core (yoke). For example, the thickness of the back iron may be changed. It is appreciated that the thickness may be either uniform or non-uniform. In one embodiment, the shape of the back iron may be changed, e.g., notches may be formed in the back iron. The back iron may have any shape, e.g., rectangular, cylindrical, trapezoidal, circular, etc.

Figure 6:
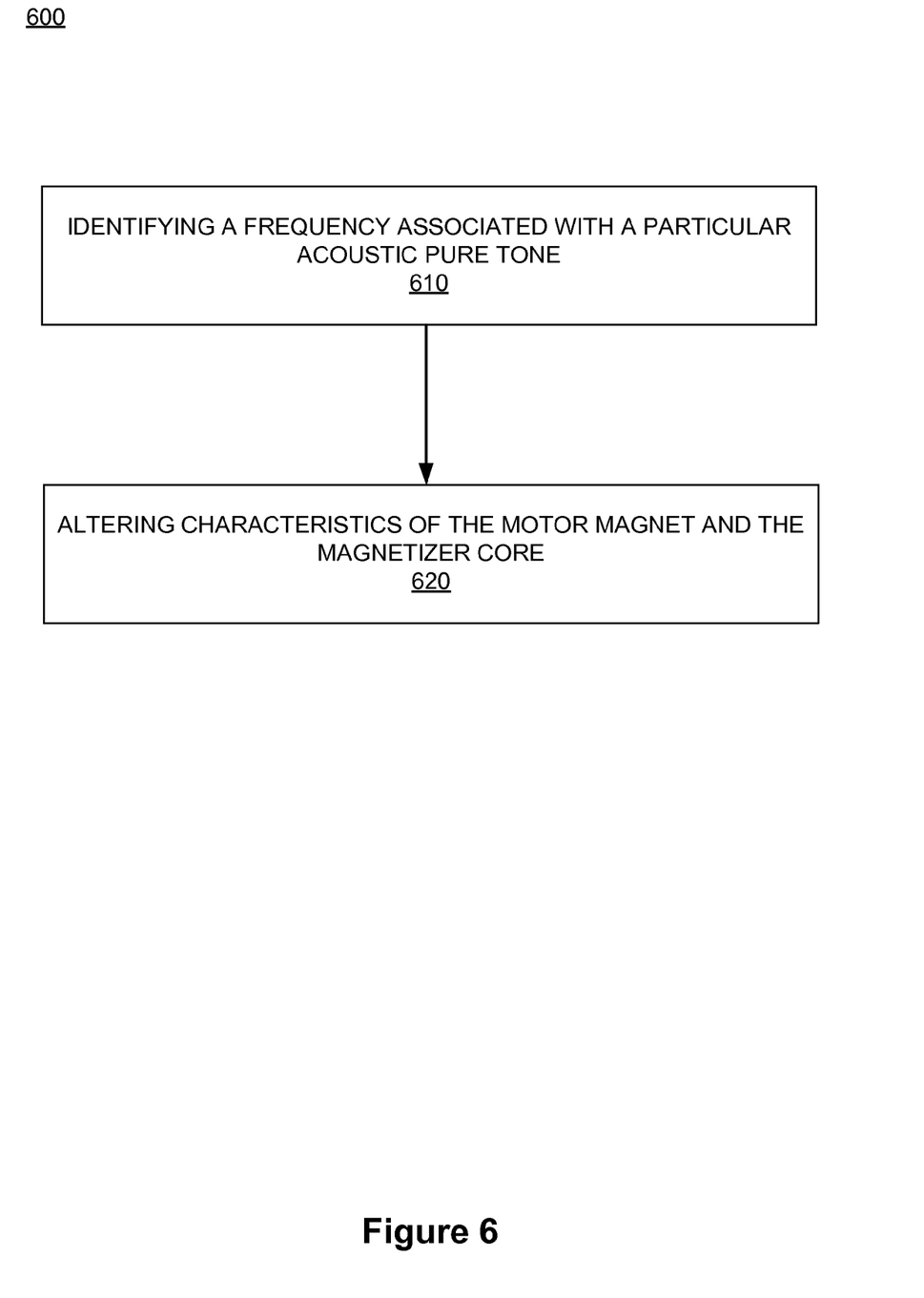
FIG. 6 illustrates an exemplary flow diagram, according to one aspect of the present embodiments.

Referring now to FIG. 6, a flow diagram 600 in accordance with one embodiment is shown. At step 610, a particular frequency associated with a particular acoustic pure tone is identified. According to one embodiment, the identified frequency is a frequency associated with an acoustic pure tone that contributes the most to degradation of hard drive performance but is not limited thereto. Once the frequency of interest is identified, at step 620, the characteristics of the motor magnet, the stator magnet, and/or the magnetizer core of the hard drive may be altered in order to superimpose a particular harmonic to the existing magnetic profile. It is appreciated that the embodiments described herein are not limited to the motor magnet 510 and the magnetizer core 520 but can be applied to any two magnetic components that rotate with respect to one another. Superimposing a particular harmonic may be designed to reduce the acoustic pure tones at the identified frequency.

According to one embodiment, the characteristics of the motor magnet 510 and/or the magnetizer core 520 include changing the material, their density, their size, their thickness, their shape, etc. Furthermore, the characteristics of the motor magnet and/or the magnetizer core may be altered by positioning a wire or multiple wires in close proximity to the motor magnet and/or the magnetizer core or any combination thereof. Furthermore, the characteristics may be altered by changing the amount of current that pass through the wire. For example, the diameter of the wire may be changed.

It is appreciated that the torque associated with the motor magnet 510 and/or magnetizer core 520 remains substantially unchanged before and after alteration of the characteristics, in one embodiment. As such, embodiments described herein reduce acoustic pure tones while maintaining sufficient torque to rotate substantially the same number of disk as before the alteration.

Figure 7:
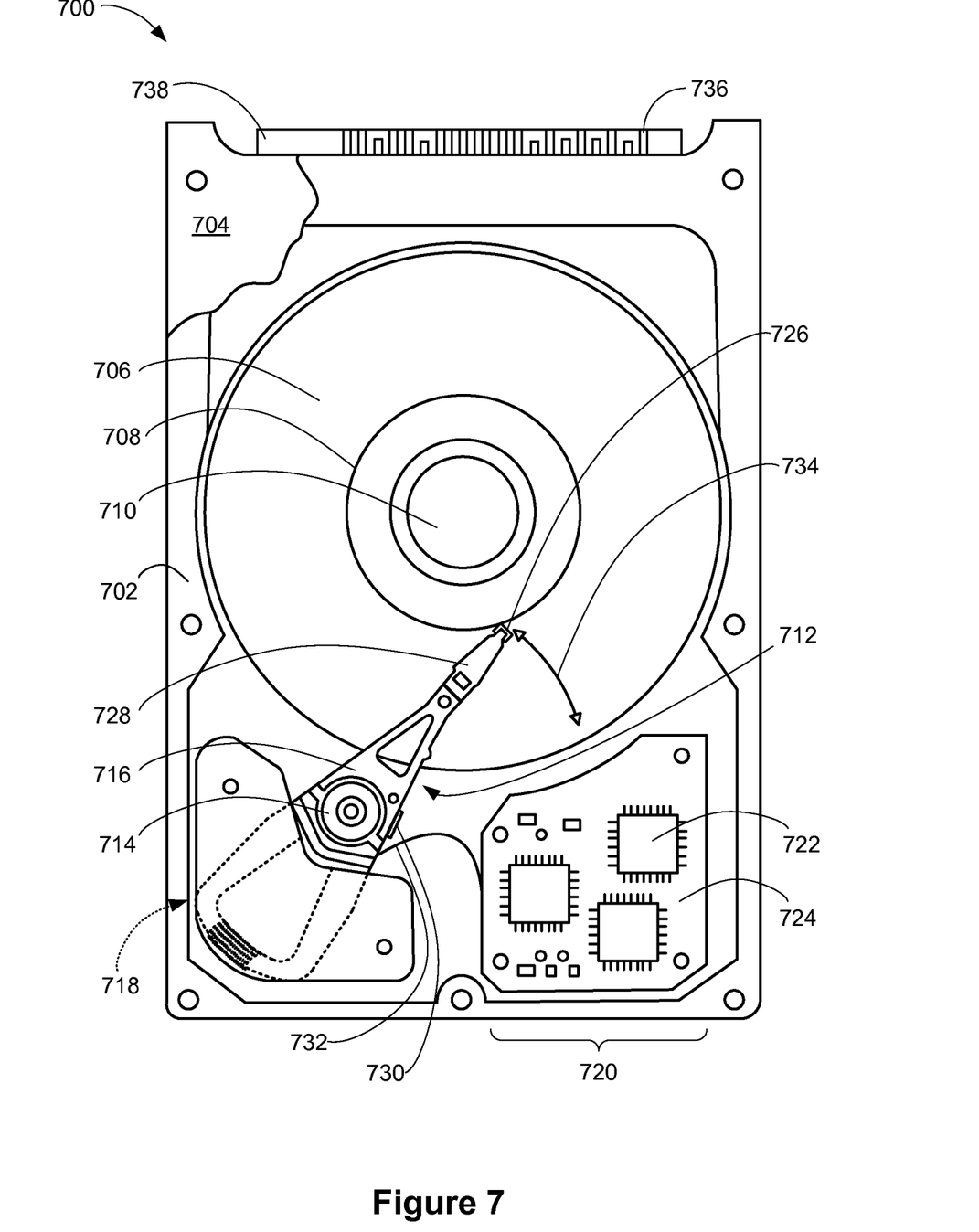
FIG. 7 illustrates an exemplary diagram of a hard drive with reduced acoustic pure tones at certain frequencies, according to one aspect of the present embodiments.

Referring now to FIG. 7, a plan view of a data storage device in which embodiments as described in FIGS. 1-6 may be implemented in is shown. A disk drive 700 generally includes a base plate 702 and a cover 704 that may be disposed on the base plate 702 to define an enclosed housing for various disk drive components. The disk drive 700 includes one or more data storage disks 706 of computer-readable data storage media. Typically, both of the major surfaces of each data storage disk 706 include a plurality of concentrically disposed tracks for data storage purposes. Each data storage disk 706 is mounted on a hub 708, which in turn is rotatably interconnected with the base plate 702 and/or cover 704. Multiple data storage disks 706 are typically mounted in vertically spaced and parallel relation on the hub 708. A spindle motor 710 rotates the data storage disks 706.

The disk drive 700 also includes an actuator arm assembly 712 that pivots about a pivot bearing 714, which in turn is rotatably supported by the base plate 702 and/or cover 704. The actuator arm assembly 712 includes one or more individual rigid actuator arms 716 that extend out from near the pivot bearing 714. Multiple actuator arms 716 are typically disposed in vertically spaced relation, with one actuator arm 716 being provided for each major data storage surface of each data storage disk 706 of the disk drive 700. Other types of actuator arm assembly configurations could be utilized as well, an example being an "E" block having one or more rigid actuator arm tips, or the like, that cantilever from a common structure. Movement of the actuator arm assembly 712 is provided by an actuator arm drive assembly, such as a voice coil motor 718 or the like. The voice coil motor 718 is a magnetic assembly that controls the operation of the actuator arm assembly 712 under the direction of control electronics 720.

The control electronics 720 may include a plurality of integrated circuits 722 coupled to a printed circuit board 724. The control electronics 720 may be coupled to the voice coil motor assembly 718, a slider 726, or the spindle motor 710 using interconnects that can include pins, cables, or wires (not shown).

A load beam or suspension 728 is attached to the free end of each actuator arm 716 and cantilevers therefrom. Typically, the suspension 728 is biased generally toward its corresponding data storage disk 706 by a spring-like force. The slider 726 is disposed at or near the free end of each suspension 728. What is commonly referred to as the read/write head (e.g., transducer) is appropriately mounted as a head unit (not shown) under the slider 726 and is used in disk drive read/write operations. The head unit under the slider 726 may utilize various types of read sensor technologies such as anisotropic magnetoresistive (AMR), giant magnetoresistive (GMR), tunneling magnetoresistive (TuMR), other magnetoresistive technologies, or other suitable technologies.

The head unit under the slider 726 is connected to a preamplifier 730, which is interconnected with the control electronics 720 of the disk drive 700 by a flex cable 732 that is typically mounted on the actuator arm assembly 712. Signals are exchanged between the head unit and its corresponding data storage disk 706 for disk drive read/write operations. In this regard, the voice coil motor 718 is utilized to pivot the actuator arm assembly 712 to simultaneously move the slider 726 along a path 734 and across the corresponding data storage disk 706 to position the head unit at the appropriate position on the data storage disk 706 for disk drive read/write operations.

When the disk drive 700 is not in operation, the actuator arm assembly 712 is pivoted to a "parked position" to dispose each slider 726 generally at or beyond a perimeter of its corresponding data storage disk 706, but in any case in vertically spaced relation to its corresponding data storage disk 706. In this regard, the disk drive 700 includes a ramp assembly (not shown) that is disposed beyond a perimeter of the data storage disk 706 to both move the corresponding slider 726 vertically away from its corresponding data storage disk 706 and to also exert somewhat of a retaining force on the actuator arm assembly 712.

Exposed contacts 736 of a drive connector 738 along a side end of the disk drive 700 may be used to provide connectivity between circuitry of the disk drive 700 and a next level of integration such as an interposer, a circuit board, a cable connector, or an electronic assembly. The drive connector 738 may include jumpers (not shown) or switches (not shown) that may be used to configure the disk drive 700 for user specific features or configurations. The jumpers or switches may be recessed and exposed from within the drive connector 738.

The foregoing description, for purposes of explanation, has been described with reference to specific embodiments. However, the illustrative discussions above are not intended to be exhaustive or to limit the invention to the precise forms disclosed. Many modifications and variations are possible in view of the above teachings. The implementations described above and other implementations are within the scope of the following claims.

What is claimed is:

1. An apparatus comprising:
   a motor magnet; and
   a magnetizer core, wherein a combination of said motor magnet and said magnetizer core comprises a magnetic profile, and wherein said combination is configured to superimpose a particular harmonic shape on said magnetic profile, wherein said superimposing of said harmonic shape is operable to reduce an acoustic pure tone at a particular frequency.

2. The apparatus of claim 1, wherein said configuration comprises a change of a material of said motor magnet.

3. The apparatus of claim 1, wherein said configuration comprises a change of a thickness of said motor magnet.

4. The apparatus of claim 1, wherein said configuration comprises a change of a shape of said combination.

5. The apparatus of claim 1, wherein said configuration comprises a wire for conducting electricity is positioned near said magnetizer core, configured to change electromagnetic properties of said magnetizer core.

6. The apparatus of claim 5, wherein said configuration comprises a change of a diameter of said wire.

7. The apparatus of claim 5, wherein said wire is a winding around said magnetizer core.

8. The apparatus of claim 1, wherein a torque of said combination remains substantially constant.

9. A method comprising:
   identifying a frequency associated with an acoustic pure tone of a combination of a motor magnet and a magnetizer core; and
   altering characteristics of said combination, wherein said altering superimposes a particular harmonic to an initial magnetic profile of said combination, and wherein said altering reduces said acoustic pure tone at said frequency.

10. The method of claim 9, wherein said characteristics comprise a material of said motor magnet.

11. The method of claim 9, wherein said characteristics comprise a thickness of said motor magnet.

12. The method of claim 9, wherein said characteristics comprise a shape of said combination.

13. The method of claim 9, wherein said altering comprises:
   positioning a wire for conducting electricity near said magnetizer core to change electromagnetic properties of said magnetizer core.

14. The method of claim 9, wherein a torque of said combination remains substantially unchanged prior to and after said altering.

15. A device comprising:
   a magnet;
   a magnetizer operable to rotate with respect to said magnet, wherein said rotation generates an acoustic pure tone at a particular frequency, wherein a combination of said magnet and said magnetizer comprises a magnetic profile; and
   a means for altering said combination to superimpose a particular harmonic shape on said magnetic profile to reduce said acoustic pure tone at said particular frequency.

16. The device of claim 15, wherein said means comprises changing a material of said magnet or said magnetizer.

17. The device of claim 15, wherein said means comprises changing a size of said magnet or said magnetizer.

18. The device of claim 15, wherein said means comprises changing a shape of said combination.

19. The device of claim 15, wherein said means comprises positioning a wire for conducting electricity near one of said magnet or said magnetizer to change electromagnetic properties of said combination.

20. The device of claim 15, wherein a torque of said combination remains substantially unchanged.

* * * * *